United States Patent
Gimblet et al.

(10) Patent No.: US 9,557,511 B2
(45) Date of Patent: Jan. 31, 2017

(54) COUPLING SYSTEM FOR A FIBER OPTIC CABLE

(71) Applicant: Corning Optical Communications LLC, Hickory, NC (US)

(72) Inventors: Michael John Gimblet, Conover, NC (US); Jason Clay Lail, Conover, NC (US); Warren Welborn McAlpine, Hickory, NC (US); David Alan Seddon, Hickory, NC (US); Catharina Lemckert Tedder, Catawba, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 0 days.

(21) Appl. No.: 15/211,411

(22) Filed: Jul. 15, 2016

(65) Prior Publication Data

US 2016/0320582 A1 Nov. 3, 2016

Related U.S. Application Data

(62) Division of application No. 14/099,918, filed on Dec. 7, 2013, now Pat. No. 9,415,551.
(Continued)

(51) Int. Cl.
*G02B 6/44* (2006.01)
*B29C 47/02* (2006.01)
(Continued)

(52) U.S. Cl.
CPC ......... *G02B 6/4486* (2013.01); *B29C 47/0014* (2013.01); *B29C 47/025* (2013.01);
(Continued)

(58) Field of Classification Search
CPC ..... G02B 6/4494; G02B 6/4429; G02B 6/443; G02B 6/4486; G02B 6/4401; G02B 6/4479
See application file for complete search history.

(56) References Cited

U.S. PATENT DOCUMENTS 4,304,699 A 12/1981 Keeney
5,042,907 A 8/1991 Bell et al.
(Continued)

FOREIGN PATENT DOCUMENTS

EP 1220000 B1 1/2008
EP 1610163 B1 10/2011
(Continued)

OTHER PUBLICATIONS

International Search Report and Written Opinion of the Internation Search Authority; PCT/US2014/041618 Dated Sep. 4, 2014, 9 Pages.
(Continued)

*Primary Examiner* — Thomas A Hollweg
*Assistant Examiner* — Mary A El Shammaa
(74) *Attorney, Agent, or Firm* — William D. Doyle

(57) ABSTRACT

A fiber optic cable includes a jacket, an element of the cable interior to the jacket, and first and second powders. The element includes a first surface and a second surface. The cable further includes a third surface interior to the jacket and facing the first surface at a first interface and a fourth surface interior to the jacket and facing the second surface at a second interface. At least one of the third and fourth surfaces is spaced apart from the jacket. The first powder is integrated with at least one of the first and third surfaces at the first interface and the second powder integrated with at least one of the second and fourth surfaces at the second interface. The first interface has greater coupling than the second interface at least in part due to differences in the first and second powders.

2 Claims, 8 Drawing Sheets

Related U.S. Application Data

(60) Provisional application No. 61/834,630, filed on Jun. 13, 2013.

(51) Int. Cl.
   *B29C 47/00* (2006.01)
   *B29D 11/00* (2006.01)
   *B29L 11/00* (2006.01)

(52) U.S. Cl.
   CPC .. *B29D 11/00663* (2013.01); *B29D 11/00875* (2013.01); *G02B 6/443* (2013.01); *G02B 6/448* (2013.01); *G02B 6/4434* (2013.01); *B29L 2011/0075* (2013.01)

(56) References Cited

U.S. PATENT DOCUMENTS

| | | |
|---|---|---|
| 5,388,175 A | 2/1995 | Clarke |
| 5,649,041 A | 7/1997 | Clyburn, III et al. |
| 5,684,904 A | 11/1997 | Bringuier et al. |
| 5,745,628 A | 4/1998 | Benzel et al. |
| 6,195,486 B1 | 2/2001 | Field et al. |
| 6,256,438 B1 | 7/2001 | Gimblet |
| 6,304,701 B1 | 10/2001 | Bringuier et al. |
| 6,483,971 B2 | 11/2002 | Gaillard et al. |
| 6,546,712 B2 | 4/2003 | Moss et al. |
| 6,574,400 B1 | 6/2003 | Lail |
| 7,212,715 B2 | 5/2007 | Dallas et al. |
| 7,277,615 B2 | 10/2007 | Greenwood et al. |
| 7,630,605 B2 | 12/2009 | Bringuier et al. |
| 8,145,022 B2 | 3/2012 | Overton et al. |
| 8,180,190 B2 | 5/2012 | Bringuier et al. |
| 8,195,018 B2 | 6/2012 | Overton et al. |
| 8,229,263 B2 | 7/2012 | Parris et al. |
| 8,620,124 B1 | 12/2013 | Blazer et al. |
| 8,649,644 B2 | 2/2014 | Greenwood, III et al. |
| 9,182,565 B2 | 11/2015 | Gimblet et al. |
| 2002/0034367 A1 | 3/2002 | Gaillard et al. |
| 2004/0240808 A1 | 12/2004 | Rhoney et al. |
| 2005/0045098 A1* | 3/2005 | Fleury ............... B05C 19/04 118/612 |
| 2008/0193092 A1 | 8/2008 | Greenwood et al. |
| 2009/0003780 A1* | 1/2009 | Bringuier ............ G02B 6/4494 385/113 |
| 2009/0034919 A1 | 2/2009 | Caldwell et al. |
| 2009/0190890 A1 | 7/2009 | Freeland et al. |
| 2010/0027949 A1* | 2/2010 | Bringuier ............ G02B 6/4483 385/103 |
| 2011/0135816 A1* | 6/2011 | Burns ................ B29C 47/0014 427/163.2 |
| 2011/0176782 A1 | 7/2011 | Parris |
| 2011/0286705 A1 | 11/2011 | Blazer et al. |
| 2012/0014652 A1* | 1/2012 | Parris ................ G02B 6/4411 385/111 |
| 2012/0063731 A1 | 3/2012 | Fitz et al. |

FOREIGN PATENT DOCUMENTS

| | | |
|---|---|---|
| JP | 2001343566 A | 12/2001 |
| KR | 2006122253 A | 11/2006 |

OTHER PUBLICATIONS

Nextrom, "SZ Stranding Line OFC 70," http://www.nextrom.com/877_en_SZ-Stranding-Line.aspx, accessed Feb. 21, 2014, 2 pages.

Rechberger, M., Hörschläger, W., "Buffering & SZ-Stranding Process for Compact Dry Tube FO-Cable," Proceedings of the 56th Annual International Wire & Cable Symposium, 2007, pp. 614-617, last accessed on Feb. 24, 2014 from http://ecadigitallibrary.com/pdf/IWCS07/15-5.pdf.

Marik, J., "Advanced SZ Stranding Technology for Enhanced Applications," 4 pages, last accessed on Feb. 21, 2014 from http://rosendahlaustria.com/custom/rosendahlaustria/Rosendahl-Products-PDF/1062003111324_p1_.pdf.

\* cited by examiner

COUPLING SYSTEM FOR A FIBER OPTIC CABLE

RELATED APPLICATIONS

This application is a divisional of U.S. patent application Ser. No. 14/099,918, filed Dec. 7, 2013, which claims the benefit of priority under 35 U.S.C. §119 of U.S. Provisional Application Ser. No. 61/834,630, filed on Jun. 13, 2013, the content of which is relied upon and incorporated herein by reference in their entirety.

BACKGROUND

Aspects of the present disclosure relate generally to fiber optic cables, and more specifically to frictional coupling of elements to adjoining structure within the cables.

Coupling of elements, such as stacks of ribbons of optical fibers, tight-buffered optical fibers, or loose tubes containing optical fibers, etc., within a fiber optic cable to surrounding or adjoining structure of the cable may reduce axial displacement of the elements and corresponding buckling of optical fibers associated with the elements that may otherwise lead to increased signal attenuation of the optical fibers. For example, if the elements are insufficiently coupled, the elements may become redistributed in a cable when the cable stretches or bends, and as a result the elements may become unevenly packed into a section of the cable. When the cable subsequently straightens or contracts in cooler temperatures or released tension, the elements in the packed section may then buckle or kink, leading to attenuation and/or optical fiber damage.

Foam tape, binder yarn, grease, and adhesives may be used in a fiber optic cable to facilitate coupling between elements and the surrounding structure within the cable. However, the foam may be bulky and may correspondingly increase a cable diameter and associated material costs. Binder yarns may be cumbersome to remove and may limit the speed of a manufacturing line, such as when being applied in a helical pattern around bound elements. Grease and adhesives can be messy to work with and apply. A need exists for an efficient solution to couple elements within a fiber optic cable to surrounding and/or adjoining structure of the cables, such as without substantially increasing the cable diameter and/or associated material costs.

SUMMARY

One embodiment relates to a fiber optic cable, which includes a jacket, an element of the cable interior to the jacket, and first and second powders. The element includes a first surface and a second surface. The cable further includes a third surface interior to the jacket and facing the first surface at a first interface and a fourth surface interior to the jacket and facing the second surface at a second interface. At least one of the third and fourth surfaces is spaced apart from the jacket. The first powder is integrated with at least one of the first and third surfaces at the first interface and the second powder integrated with at least one of the second and fourth surfaces at the second interface. The first interface has greater coupling than the second interface at least in part due to differences in the first and second powders.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Before turning to the Figures, which illustrate exemplary embodiments now described in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures may be applied to embodiments shown in others of the Figures.

Figure 1:
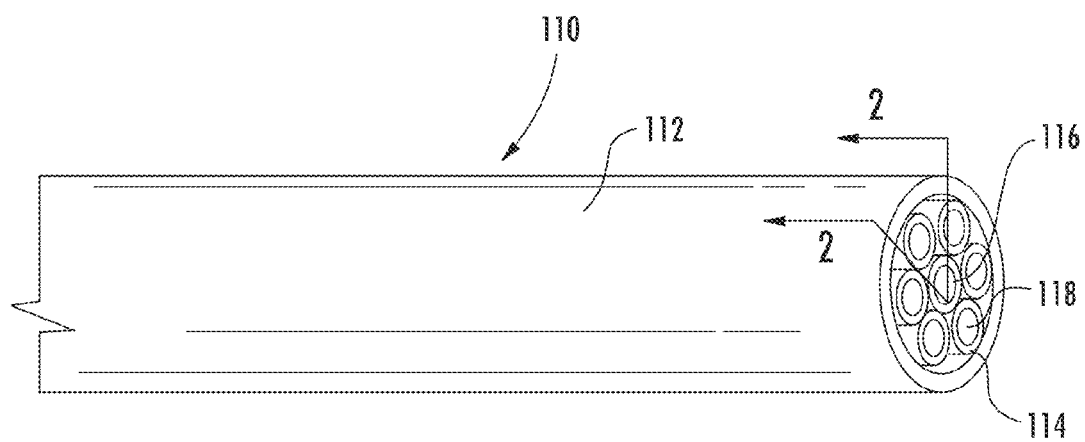
FIG. 1 is a perspective view of a fiber optic cable according to an exemplary embodiment.
Figure 2:
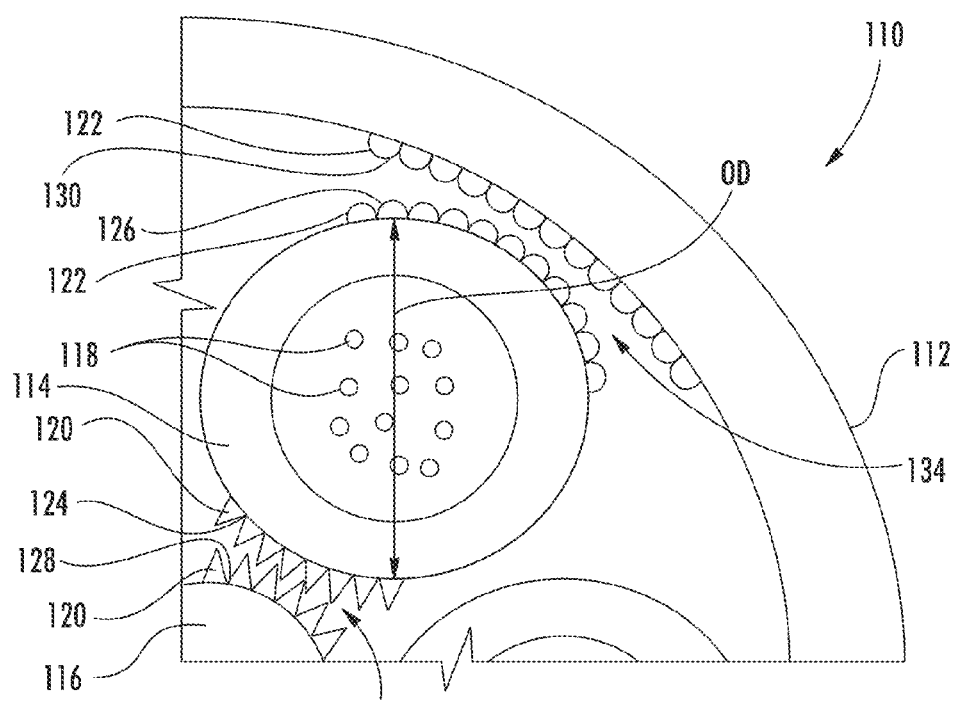
FIG. 2 is a conceptual drawing of the cable of FIG. 1 from a partial cross-sectional viewpoint taken along section 2-2 shown in FIG. 1, emphasizing particular components of the cable, according to an exemplary embodiment.

Referring to FIGS. 1-2, a fiber optic cable, in the form of a six-position loose-tube fiber optic cable 110, includes a jacket 112 and one or more elements interior thereto. As shown in FIG. 1, the elements may include tubes 114, such as buffer tubes, micromodule sheaths, tight-buffers, binding films, etc., supporting (e.g., surrounding, encasing, reinforcing, shielding) one or more optical fibers 118 directly therein; or indirectly therein, separated by one or more intermediate narrower tubes supporting the one or more optical fibers. Such a cable 110 may be intended for use in outside environments, and may be designed to block water from flowing through open spaces therein (as more fully explained below), and may include ultra-violet light blocking additives in the jacket 112, such as carbon black.

In some embodiments, the tubes 114 are stranded around a central strength member 116, such as a glass-reinforced plastic rod, or a rod of another dielectric material, or another material. According to an exemplary embodiment, the central strength member 116 may be up-jacketed or overmolded concentrically with a polymer, such as polyvinyl chloride, polyethylene, or another material, to increase the diameter of the central strength member 116 to facilitate a particular stranding pattern or profile of the tubes 114 wrapped around the central strength member 116. For example, the tubes 114 may be stranded around the central strength member 116 in a reverse-oscillating pattern, where the reversals may serve to provide convenient locations for accessing the tubes 114 in a low stress state and with extra length for handling.

Figure 12:
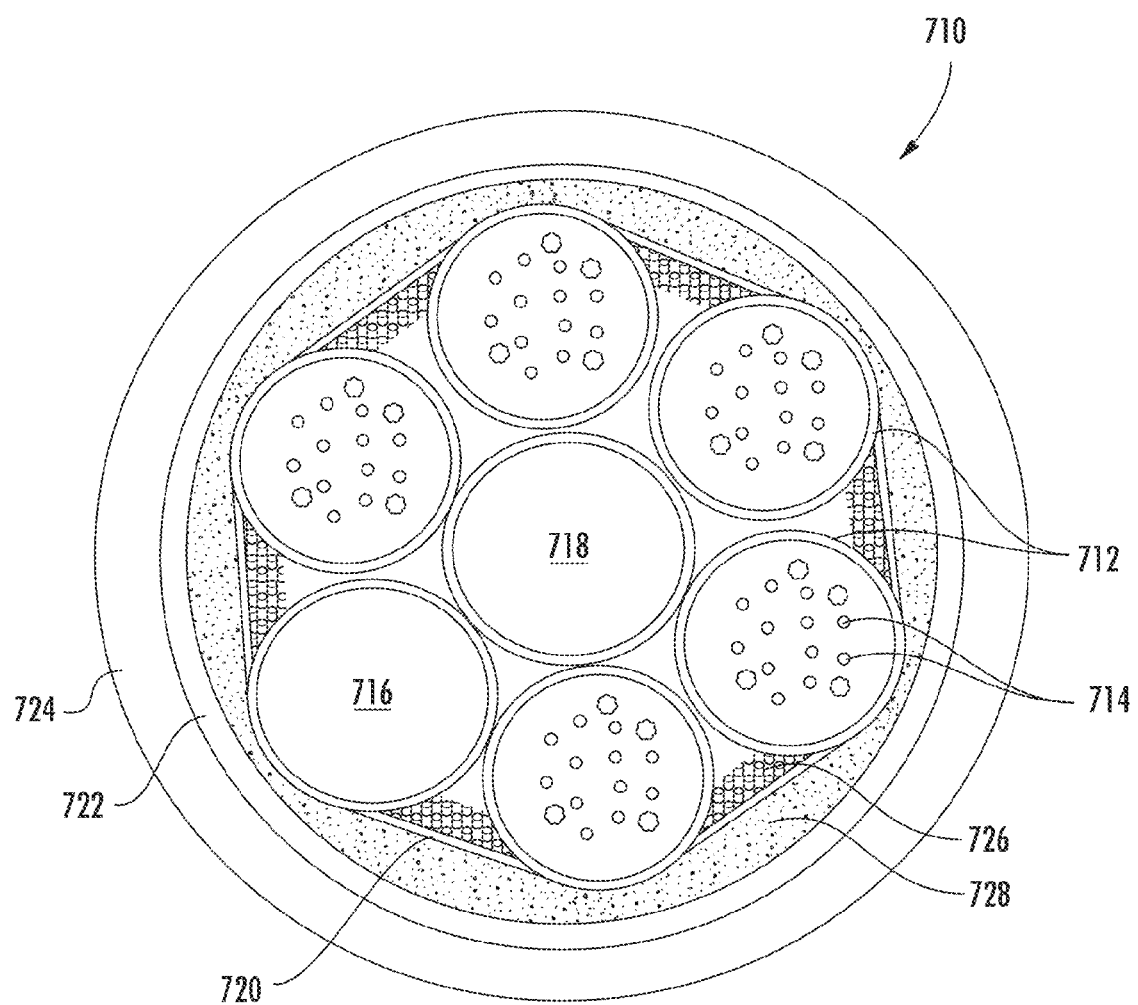
FIGS. 12-14 are cross-sectional views of fiber optic cables according to other exemplary embodiments.

According to an exemplary embodiment, the tubes 114 are buffer tubes having an outer diameter OD of roughly between 1.5 to 2.5 mm. The tubes 114 may be polymeric, such as being formed from an extruded polymer and may include polycarbonate, polypropylene, polyethylene, polybutylene terephthalate, and/or other materials. The tubes 114 may support more than one optical fiber 118 each, such as at least four, at least six, at least twelve optical fibers 118. In some embodiments, dummy- or fill-rods (see, e.g., fill rod 716 as shown in FIG. 12) are stranded around the central strength member 116 in place of one or more of the tubes 114.

In contemplated embodiments, the loose tube fiber optic cable 110 may further include additional components, such as layers of yarn or water-blocking tape. The yarn may be water-blocking yarn and/or tensile strength yarn, such as aramid or fiberglass yarn. The cable 110 may further include one or more rip cords or other access features. In some embodiments, the cable 110 may include a layer of armor (see, e.g., armor 722 as shown in FIG. 12), such as corrugated steel armor or a tough polymeric dielectric armor (e.g., rigid polyvinyl chloride material of Shore D hardness greater than 65). The cable 110 may alternatively or additionally include one or more strength members, such as strength member rods, that are embedded in the jacket 112.

Figure 13:
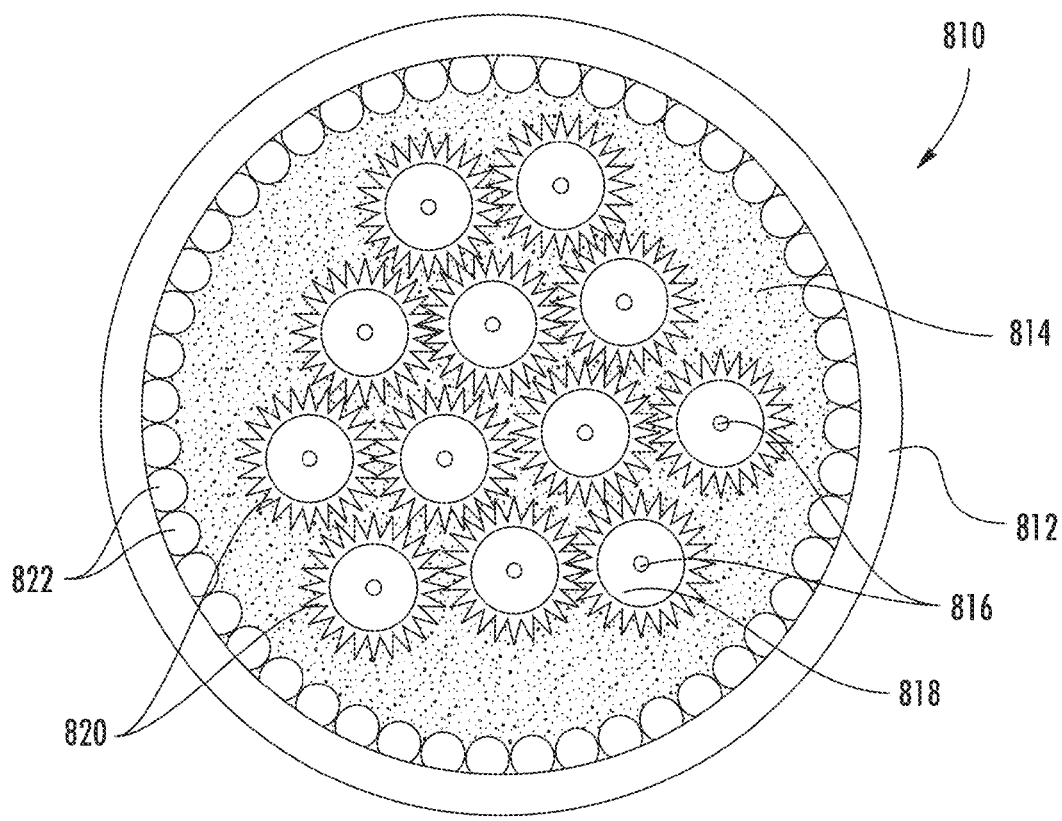
Figure 14:
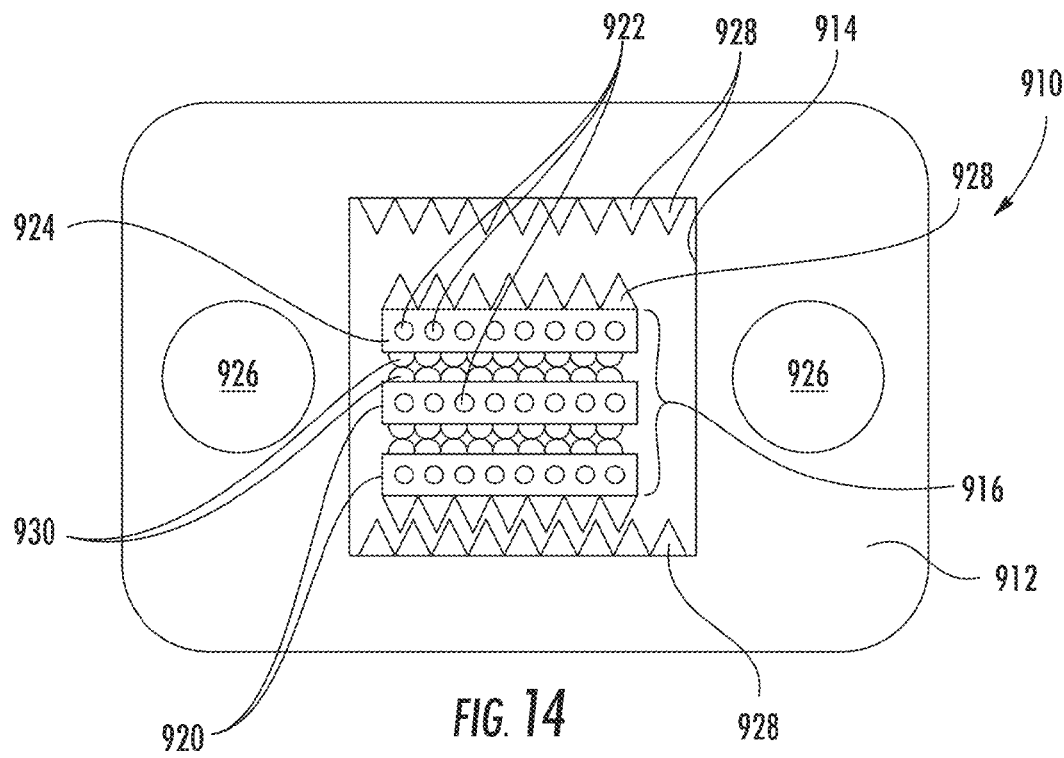

In contemplated embodiments, the one or more optical fibers 118 of embodiments disclosed herein may be single-mode optical fibers, multi-mode optical fibers, multi-core optical fibers, and/or bend-insensitive optical fibers such as CLEARCURVE® manufactured by Corning Inc. of Corning, N.Y. The one or more optical fibers 118 of embodiments disclosed herein may be tight-buffered optical fibers having a layer of polyvinyl chloride directly contacting an outermost layer of the optical fiber (e.g., hard coating) and a diameter of less than 1 mm (see, e.g., tight-buffered optical fibers 816 as shown in FIG. 13). The one or more optical fibers 118 of embodiments disclosed herein may be part of one or more ribbons of optical fibers, which may include side-by-side arrangements of the optical fibers 118 bound together in a common matrix, such as an ultra-violet light cured acrylate resin or other matrix (see, e.g., fiber optic ribbons 920 as shown in FIG. 14).

As indicated in the Background section above, maintaining a particular-degree of coupling in specific areas within the cable 110, while facilitating sliding in other areas therein may improve performance of the cable 110, such as by reducing a likelihood for attenuation of the optical fibers 118 associated with buckling of the tubes 114 and/or fibers 118 during changes in temperature as elements in the cable 110 expand and contract at different rates due to differences in material composition and associated thermal expansion properties, and/or when the cable is hung and placed in tension and loaded with ice or wind. In some embodiments, a high-degree of coupling between the tubes 114 and the central strength member 116 may mitigate effects of temperatures changing in the loose tube cable 110 and/or improve manufacturability thereof by opposing pulling forces of the extrusion cone of the jacket 112 on tubes 114 when extruding the jacket 112. A lower-degree of coupling between the tubes 114 and the jacket 112 may further improve cable 110 performance by allowing the jacket 112 to expand/contract and flex with less displacement of the tubes 114 and/or other elements interior thereto.

Referring now to FIG. 2, in some embodiments the fiber optic cable 110 includes first and second powders 120, 122 that are positioned interior to the jacket 112 and adjacent an element interior to the jacket 112, where the element in FIG. 2 is the buffer tube 114. The buffer tube 114 includes first and second surfaces 124, 126, and the cable includes a third surface 128 facing (e.g., adjoining, opposing, interfacing with) the first surface 124 at a first interface 132, and a fourth surface 130 facing the second surface 126 at a second interface 134. In some embodiments, at least one of the third and fourth surfaces 128, 130 is internal to the cable 110 and separated from the jacket 112, such that the separated surface is not part of, adjoining, or in direct contact with the jacket 112.

The first powder 120 in FIG. 2 is symbolically represented by spikes extending from the first and third surfaces 124, 128 and the second powder 122 is symbolically represented by mounds extending from the second and fourth surfaces 126, 130. According to an exemplary embodiment, the first powder 120 is integrated with one or both of the first and third surfaces 124, 128 at the first interface 132, and the second powder 122 is integrated with one or both of the second and fourth surfaces 126, 130 at the second interface 134. In some such embodiments, the first powder 120 (spikes) differs from the second powder 122 (mounds) and contributes to the first interface 132 having greater coupling force (e.g., static friction force being a component thereof) than the second interface 134. Other contributing factors may include the geometry of the first and second interfaces 132, 134, the materials of the third and fourth surfaces 128, 130, normal loads at the first and second interfaces 132, 134, and still other factors.

Use of different powders 120, 122 between surfaces 124, 126, 128, 130 in the different interfaces 132, 134 facilitates desired coupling effects between the components of the cable 110. In some embodiments, the coupling force at the first interface 132 is greater than the coupling force at the second interface 134, at least in part due to the selection and arrangement of the first and second powders 120, 122. For example, if the third and fourth surfaces 128, 130 are drawn in opposite directions lengthwise along a segment of the cable by a distance that allows for free sliding of the third surface 128 relative to the fourth surface 130, there is more slip displacement between the second and fourth surfaces 126, 130 than between the first and second surfaces 124, 128, at least in part due to differences in the first and second powders 120, 122 at the first and second interfaces 132, 134.

In some embodiments, the first and second powders 120, 122 are both dry powders, such as where the powders 120, 122 are substantially free of water, such as having less than 2% water by volume. Use of dry powders for the first and second powders 120, 122 may be beneficial for extrusion of the adjoining components of the cable 110 because temperatures during the extrusion may be quite high, and the dry powders release little to no steam when exposed to temperatures above the gas transition temperature threshold for water (e.g., boiling). Steam may otherwise interfere with extrusion and formation of the cable components.

According to an exemplary embodiment, the first and second powders 120, 122 of the embodiments disclosed herein may both include particles of super-absorbent polymer and/or either or both may consist thereof. As such, the powders 120, 122 may synergistically function to provide water-blocking in the cable or components thereof as well as control or facilitate a coupling system, as disclosed herein. However, the particles may still be quite different. For example, momentarily referring to FIGS. 8-11, micrographs 310, 410 show two different types of super-absorbent polymer particles 312, 412 which are both integrated with surfaces 314, 414 within fiber optic cables.

In some embodiments, the particles of the first and second powders 120, 122 consist more than 50% of super-absorbent polymer by volume, such as more than 70%. In some embodiments, the powders 120, 122 may further or otherwise include flame-retardant powders, such as aluminum trihydrate and magnesium hydroxide, and/or solid lubricant powders, such as a blend of super-absorbent polymer and talcum powder, or other powders. As such, the powders may perform a variety of functions, such as facilitate a desired coupling, block water, retard flames, and/or other functions, which may reduce or remove the need for other components in the cable, such as water-blocking tapes and yarns, mica tapes, fire-retardant fillers, and other such materials.

In some embodiments, the particles of the first powder 120 are, on average in volume, significantly larger than the particles of the second powder 122, such as at least 20% larger, at least 50% larger, at least twice as large. Difference in size of the particles may be used to influence coupling associated with the particles. In one such contemplated embodiment, the buffer tubes 114 are scored or otherwise formed with a radial groove having a width between the average sizes of the first and second particles for example and only one of the powders grips the grooves. In other embodiments, smaller powder particles, such as those having an average particle size of less than 180 micrometers, less than about 100 micrometers, may be used in locations proximate to optical fibers 118 in the cable 110, such as within the buffer tubes 114 or micromodules or integrated with matrix of fiber optic ribbons (see, e.g., powder 928, 930 and fiber optic ribbons 920 as shown in FIG. 14).

In some embodiments, particles of the first powder 120 have a greater elastic modulus than the particles of the second powder 122, which may be used to facilitate different coupling effects at the different interfaces 132, 134 within the cable 110, such as an elastic modulus that is greater by at least 10% of the lesser modulus, at least 20%, at least 50%. For example, in some embodiments, particles of super-absorbent polymer of the first powder 120 have a higher elastic modulus than particles of super-absorbent polymer of the second powder 122, which may be due to increased surface cross-linking of the particles of super-absorbent polymer of the first powder 120. In other embodiments, at least one of the first and the second powders 120, 122 further includes a blend of particles, where the particles of the auxiliary material lower the average elastic modulus of the blend, such as with use of a dry lubricant in addition to super-absorbent polymer particles.

In some embodiments, particles of the second powder are, on average, rounder than the particles of the first powder, having a difference of at least 0.15 in average spherical ovality, such as at least 0.20, at least 0.25, and/or less than a difference of 0.8. For example, more-jagged, higher-modulus particles of the first powder 120 may facilitate greater coupling between adjoining surfaces 124, 128 because the particles may induce surface abrasion and plastic deformation, whereas rounder, lower-modulus particles of the second powder 122 may facilitate sliding between surfaces 126, 130. Spherical ovality of a powder in the cable may be assessed via scanning electron microscopy by measurement of a sample of at least 100 randomly selected particles from a particular interface, such as at least 1000 particles, in conjunction with measuring the weight and composition of the particles via spectroscopy, and identifying the ratio of the widest cross-sectional area to the volume of the particle.

In some embodiments, concentration of powder particles, in terms of percentage of surface area covered of the associated element (e.g., central strength member exterior, interior wall of the jacket, exterior of a buffer tube, interior/exterior of a tube), of the second powder 122 in the second interface 134 is at least 20% different than the concentration of the first powder 120 in the first interface 132, such as at least 30% different and/or less than 90% different. Increased concentration of the particles between two interfacing surfaces may increase the impact of the particles on the resultant coupling at the interface. For example, fully covering one or both of the surfaces with round particles may greatly facilitate sliding between the surfaces, whereas covering less than 10% of the area of one of the surfaces with large, jagged, high-modulus particles may limit sliding at the interface.

According to an exemplary embodiment, particles of the first powder 120 are partially embedded in at least one of the first and third surfaces 124, 128, but include portions thereof that are not completely embedded and protrude beyond the first and/or third surface 124, 128. In some such embodiments, particles of the second powder 122 are also partially embedded in at least one of the second and fourth surfaces 126, 130, but include portions thereof that are not completely embedded and protrude beyond the second and/or fourth surface 126, 130. Partially embedding the particles in one or both surfaces of an interface influences coupling between the surfaces by anchoring the particles relative to one or both of the surfaces.

A system for partially embedding powder in components of a fiber optic cable, such as buffer tubes, is disclosed in U.S. Publication No. 2011/0135816, which is incorporated by reference herein in its entirety. For a particular powder, the percentage of particles at least partially embedded in the surfaces can be adjusted to facilitate a desired degree of coupling by changing the velocity of motive gas exiting the launch nozzle at an associated extruder and/or by changing the distance of the launch nozzle to the extruded surface. In some embodiments, at least a quarter of the particles of either or both of the powders 120, 122 are partially embedded in one or more of the associated surfaces 124, 126, 128, 130, but not fully embedded, such as at least half of the particles are partially embedded. In contemplated embodiments, electrostatic forces or other methods, instead of pneumatic conveyance, may be used to propel and embed or otherwise couple the powder 120, 122 to surfaces 124, 126, 128, 130 in the cable 110, such as by electrically charging the powder 120, 122 and molten extrudate to attract one another.

Figure 3:
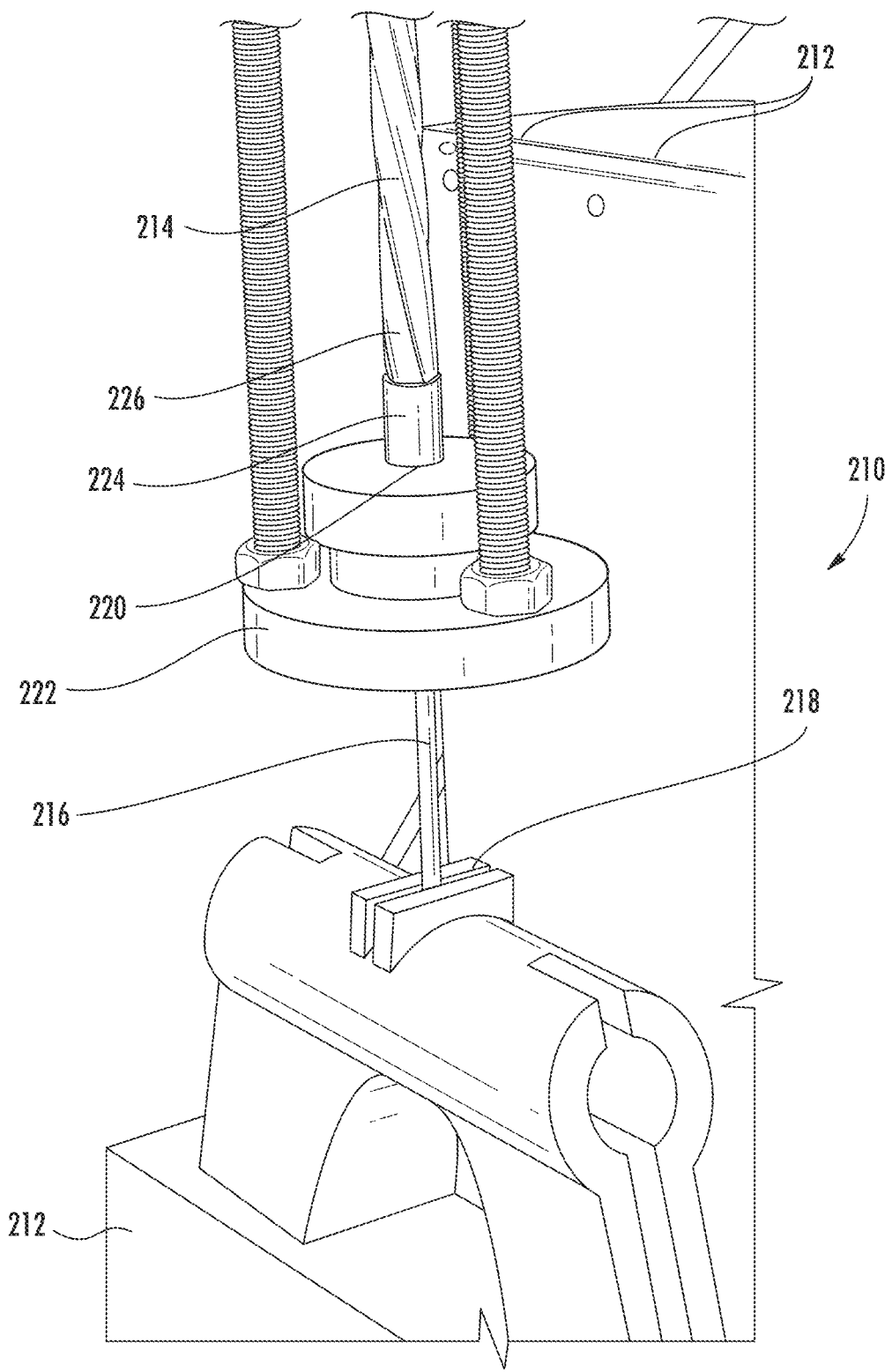
FIG. 3 is a digital image from a perspective viewpoint of test setup for testing properties of a fiber optic cable, according to an exemplary embodiment.

Coupling between components of the cable 110, which is influenced by differences in the first and second powders 120, 122, can be compared, for example, by taking a small segment of the cable 110 (e.g., 5 or 10 cm long length) and measuring the force required to move the first surface 124 relative to the third surface 128 and comparing that to the force required to move the second surface 126 relative to the fourth surface 130. Referring generally to FIG. 3, a test setup 210 with a standard conventional tensile test machine 212 (e.g., hydraulic tensile test machine) may be used to measure and compare the relative coupling forces, including static and/or kinetic frictional forces, of different interfaces within a fiber optic cable 214, such as via a pull-through test. Typically test machines in such a configuration may be used to measure the tensile force required to pull apart portions of the cable as a function of displacement, time, or other parameters.

In such a setup 210 as shown in FIG. 3, a portion of the cable 214 may be fixed, such as via a clamp 218. For example, all but the central strength member 216 may be removed from a section of the cable 214, and the central strength member 216 may then fixed in the clamp 218. Another portion of the cable 214, such as the jacket 226 and/or buffer tubes stranded about the central strength member 216, may be positioned on an opposite side of a plate 220, which is supported on a conveyor 222 of the test machine 212 and which has a hole or slot therein that is sized to only allow a particular subsection of the cable 214 to be pulled through the slot of the plate 220. As the conveyor 222 is raised by the tensile test machine 212, at least the jacket 226 of the cable 214 is drawn away from the clamp 218 by the test machine 212, where central strength member 216 of the cable 214 is still fixed in the clamp 218. As shown in FIG. 3, a collar 224 or other circumferential reinforcement may be applied around the jacket 226 or other outermost component of the cable 214 to prevent buckling of that component during the pull-through test.

In other tests with such a setup 210, opposing clamps 218, one in place of the plate 220, may be used to grip different components of the cable 214 on opposite ends of a segment of the cable. The test machine 212 may then be used to pull the components lengthwise apart from one another, where force is measured, for example, as a function of displacement. Subsequently, slip displacement may be measured and/or observed between different surfaces within the cable 214, such as between the central strength member and surrounding buffer tubes. For example, the force to pull the central strength member 216 through the surrounding buffer tubes can be tested and then compared to the force to pull the buffer tubes and central strength member together through the jacket 226 or armor layer or other surrounding structure in the cable 214, which can separately be tested.

Figure 4:
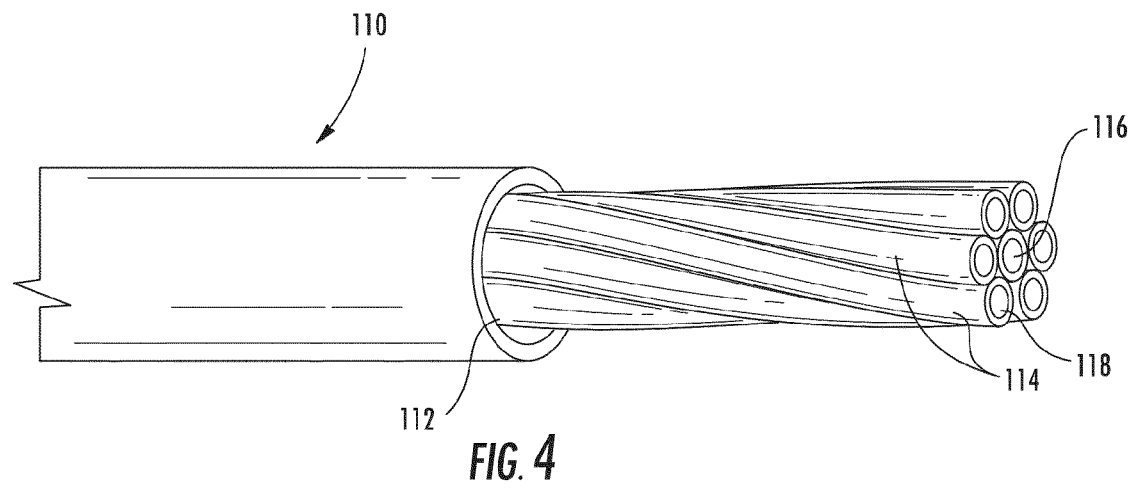
FIG. 4 is a perspective view of the fiber optic cable of FIG. 1 with the jacket drawn back or removed exposing elements within the jacket, according to an exemplary embodiment.

Referring once more to FIGS. 2 and 4, the first interface 132 of the cable 110 has greater coupling than the second interface 134, at least in part due to differences in the first and second powders 120, 122. Further, the greater coupling is such that when the third and fourth surfaces 128, 130 are drawn in opposite directions a combined distance of 2 cm lengthwise along a 10 cm segment of the cable, greater slip displacement occurs between the second and fourth surfaces 126, 130 than occurs between the first and third surfaces 124, 128. The increased coupling may be due to one or more of a combination of factors related to the powders, such as frictional forces, interlocking or opposing surface components, adhesion, abrasion, or other factors. In some embodiments, the first interface 132 has a greater static friction force than the second interface 134 at least in part due to differences in the first and second powders 120, 122, thereby facilitating increased coupling between the first and third surfaces 124, 128. In some embodiments, the static coefficient of friction between surfaces at the first interface 132 is at least 0.2 greater than the static coefficient of friction at the second interface 134, such as at least 0.4 greater.

Figure 5:
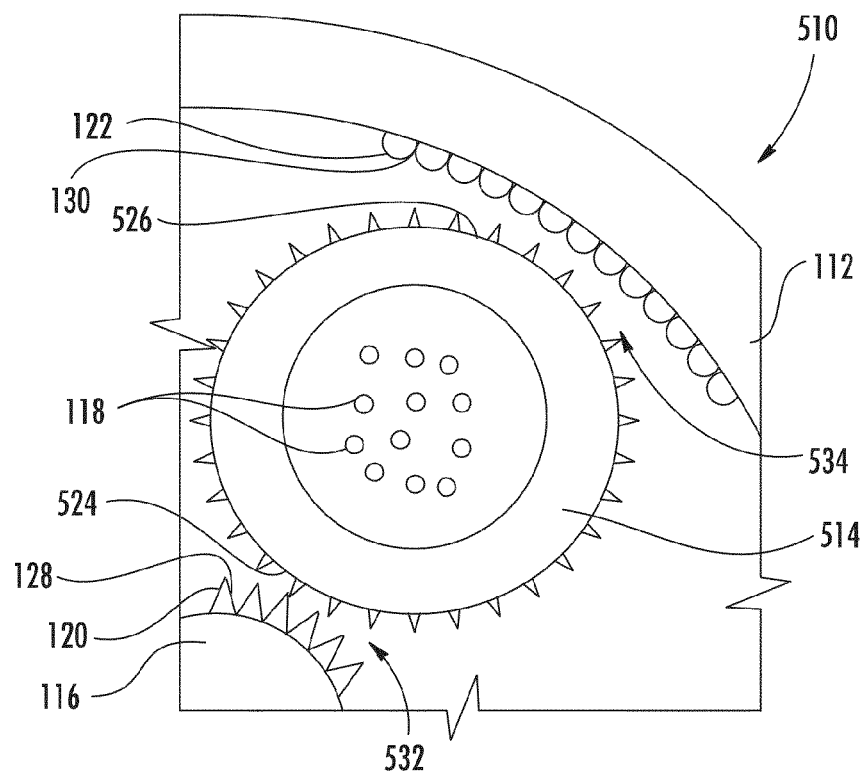
FIG. 5 is a conceptual drawing of a cable similar to the cable of FIG. 1 from a partial cross-sectional viewpoint taken along section 2-2 shown in FIG. 1, emphasizing particular components of the cable, according to another exemplary embodiment.

Referring now to FIG. 5, a fiber optic cable 510, similar to the cable 110 of FIG. 1, includes a jacket 112 and an element of the cable interior to the jacket 112 in the form of a buffer tube 514. The buffer tube 514 has a first surface 524 and a second surface 526. A central strength member 116 of the cable 510 includes a third surface 128 that is interior to the jacket 112 and facing the first surface 524 of the buffer tube 514 at a first interface 532. As such, the third surface 128 is spaced apart from the jacket 112. A fourth surface 130 interior to the jacket 112, defined by the inside surface of the jacket 112, is facing the second surface 526 of the buffer tube 512 at a second interface 534. The cable 510 further includes a first powder 120 integrated with the third surface 128 at the first interface 532 and a second powder 122 integrated with the fourth surface 130 at the second interface 534. According to an exemplary embodiment, the first interface 532 has greater coupling than the second interface 534, at least in part due to differences in the first and second powders 120, 122.

According to an exemplary embodiment, the buffer tube 514 (or other tube or element of the cable) has an exterior that is uniform in texture, but may be roughened, scored, or otherwise formed to increase interaction with adjoining surfaces, which is symbolically represented in FIG. 5 by small points extending from the surface. The exterior surface texture of the buffer tube 514 may increase or otherwise influence coupling of the buffer tube 514 with the third and fourth surfaces 128, 130 within the cable 510. In other embodiments, the buffer tube 514 is not textured, but may be formed from a conformal material that increases interaction with the adjoining surfaces by deflection around powder particles. In still other embodiments, buffer tubes having a smooth, uniform outer surface may be used, where coupling of the buffer tube surface to adjoining structures is influenced by different powders integrated with surrounding and/or adjoining structures of the cable, such as the central strength member 116 and interior of the jacket 112, regardless of the buffer tube 514 texture.

Figure 6:
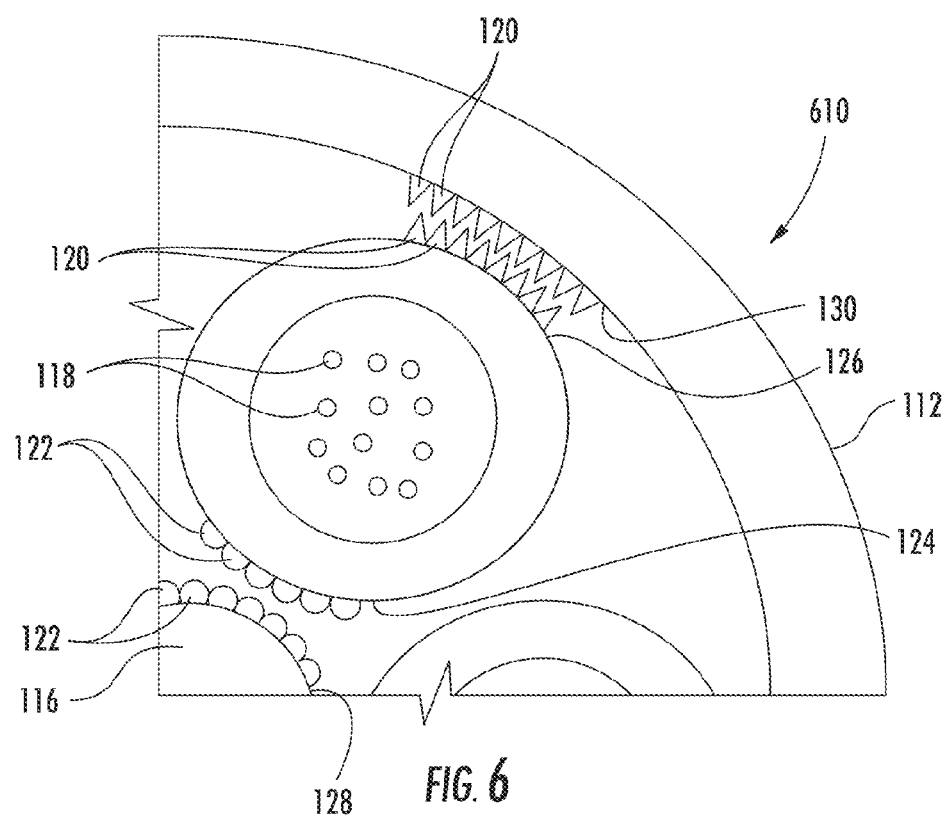
FIG. 6 is a conceptual drawing of a cable similar to the cable of FIG. 1 from a partial cross-sectional viewpoint taken along section 2-2 shown in FIG. 1, emphasizing particular components of the cable, according to yet another exemplary embodiment.
Figure 7:
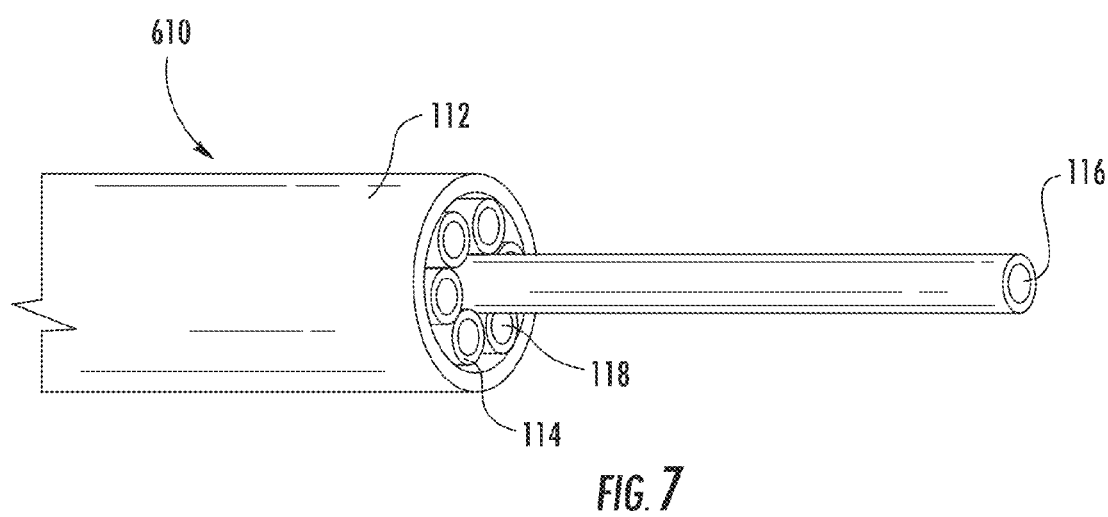
FIG. 7 is a perspective view of a cable similar to the fiber optic cable of FIG. 1 with the jacket and some of the interior elements of the cable drawn back or removed exposing other elements, according to an exemplary embodiment.
Figure 8:
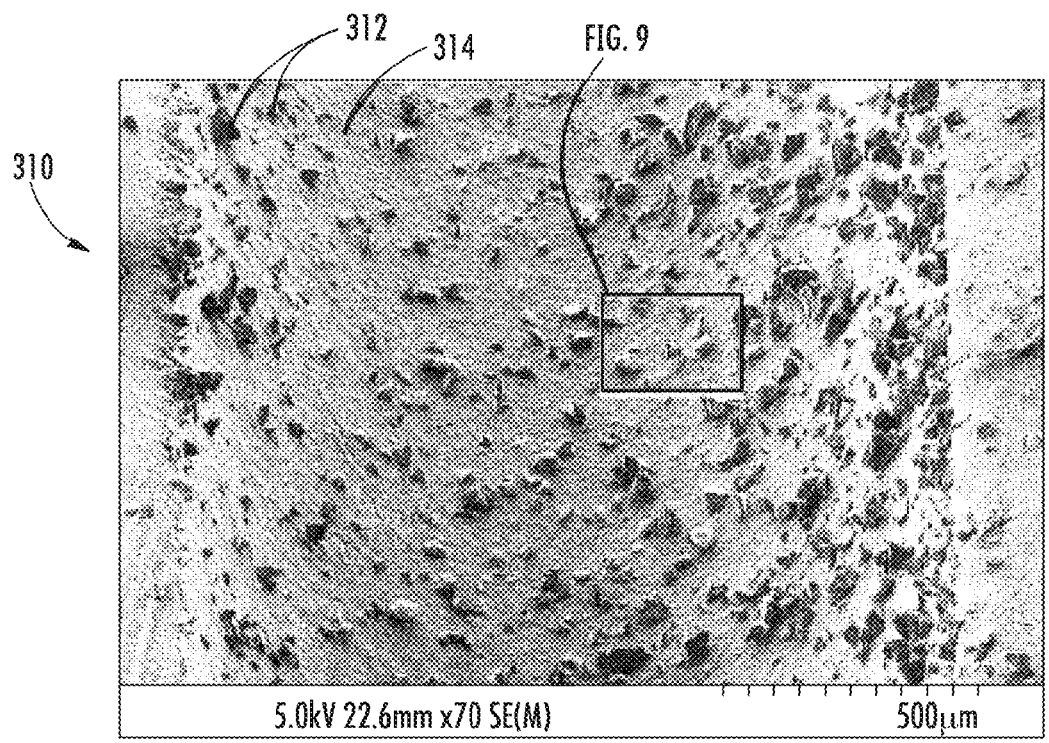
FIGS. 8-9 are micrograph digital images from a scanning electron microscope of particles of a first powder integrated with a surface of a fiber optic cable.
Figure 9:
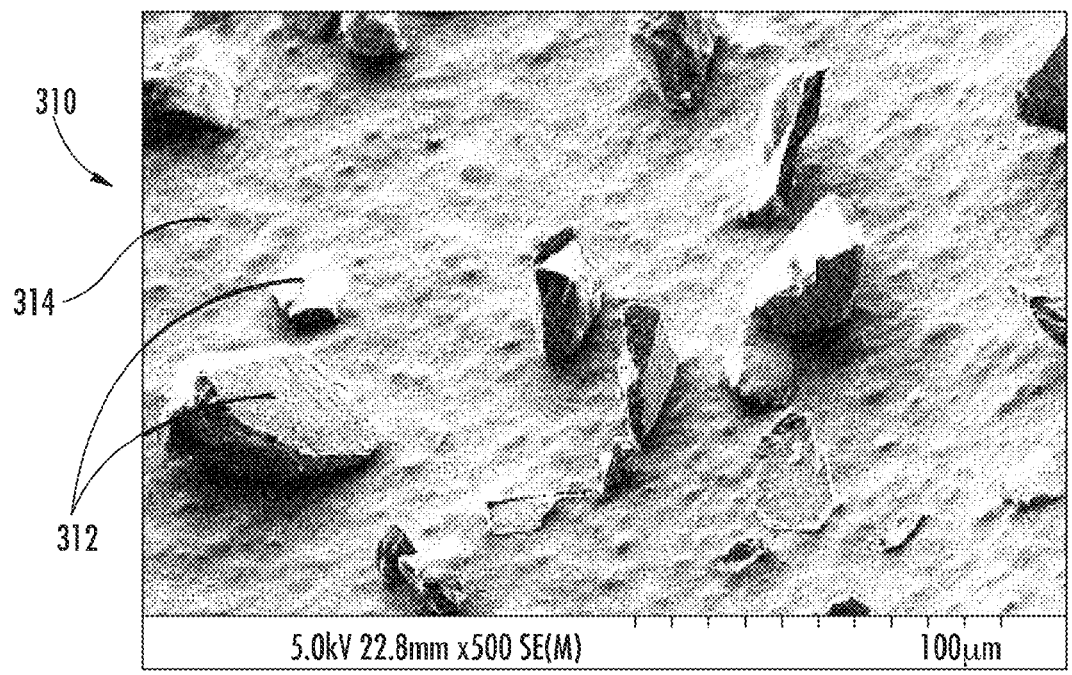
Figure 10:
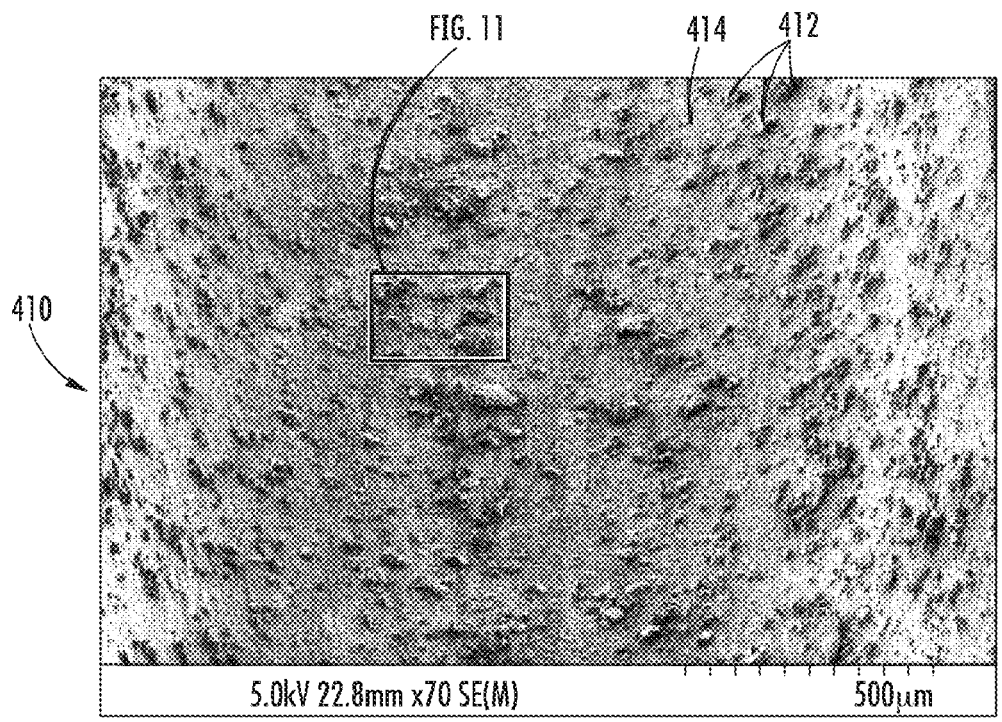
FIGS. 10-11 are micrograph digital images from a scanning electron microscope of particles of a second powder integrated with a surface of a fiber optic cable.
Figure 11:
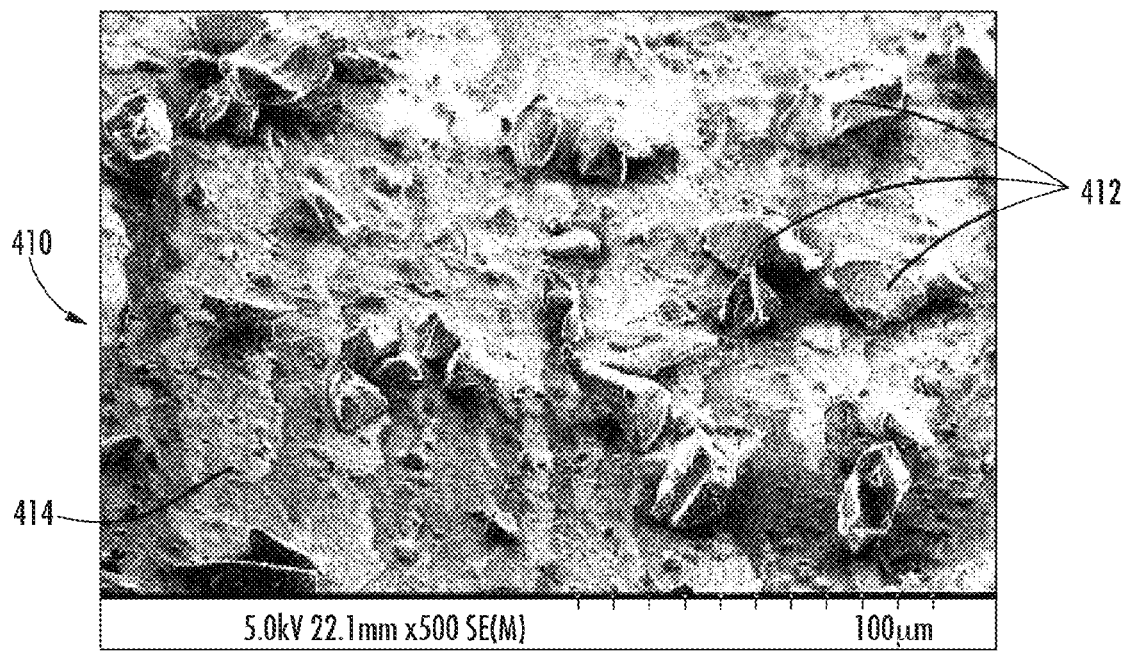

Referring now to FIG. 6, in some contemplated embodiments the first and second powders 120, 122 may be oppositely arranged in a cable 610 relative to the configuration shown in FIG. 1, with the second powder (e.g., lower-friction powder) adjoining the central strength member and the first powder (e.g., higher-friction powder) adjoining the interior of the jacket. FIG. 7 shows an example where pulling the central strength member 116 and the jacket 112 apart has drawn only the central strength member 116 from the surrounding structure. The buffer tubes 114 in this embodiment remain coupled to the jacket 112.

Alternatively, the powders 120, 122 may be arranged between adjoining stranded elements of a cable, such as buffer tubes 114, filler rods, conductive wires, and other stranded elements in the cable, so as to facilitate easy separation of some stranded elements, but high coupling between other elements. In still other contemplated embodiments, the first and second powders 120, 122 may be arranged on opposite sides of the wall of a buffer tube 114 or other tube in the cable, such as with lower-friction powder within the buffer tubes 114 and higher friction powder on or otherwise adjoining the exterior of the buffer tubes 114, allowing optical fibers 118 to slide relatively freely within the buffer tubes 114, while having the buffer tubes 114 remain coupled to adjoining elements, such as the central strength member 116, adjoining buffer tubes 114, and/or the jacket 112 or other structures.

Referring now to FIG. 12, a fiber optic cable 710 includes a plurality of buffer tubes 712 containing optical fibers 714 and a filler rod 716 stranded around a central strength member 718. A tube in the form of a binder film 720 surrounds the stranded buffer tubes 712 and normally loads the buffer tubes 712 against the central strength member 718 facilitating coupling therebetween. According to an exemplary embodiment, the cable 710 further includes an armor 722 layer surrounding the binder film 720 and a jacket 724 exterior to the armor 722. In some embodiments, the armor 722 is metallic, such as including corrugated steel or copper, and the jacket 724 is polymeric, such as including polyethylene.

A first powder 726 (e.g., higher-friction powder), as disclosed herein with regard to the other embodiments, is positioned on an interior surface of the film binder 720 and a second powder 728 (e.g., lower-friction powder), as disclosed herein with regard to the other embodiments, is positioned on an exterior surface of the thin film. In some embodiments, the powders may be partially embedded in opposite sides of the film binder 720. U.S. application Ser. No. 13/790,329 filed Mar. 8, 2013 is incorporated herein by reference in its entirety, and provides disclosure related to extruding binder films and integrating powder therewith. Positioning a lower friction powder on the exterior of the binder film 720 may facilitate movement/sliding of the core assembly (binder film 720 and contents therein) relative to the armor 722 as the cable 710 stretches and contracts, potentially improving attenuation the performance of optical fibers 714 therein as discussed in the Background section and elsewhere herein.

In other contemplated embodiments, the first powder 726 is positioned on one side of the buffer tubes 712, between the buffer tubes 712 and the film binder 720, and the second powder 728 is positioned on another side of the buffer tubes 712, between the buffer tubes 712 and the central strength member 718, whereby the buffer tubes 712 have greater coupling to the central strength member 718 than to the binder film 720. In still other embodiments, the second powder 728 is positioned on the interior of the buffer tubes 712, between the buffer tubes 712 and the optical fibers 714 therein, and the first powder 726 is integrated with the interior surface of the binder film 720, whereby the different powders 726, 728 contribute to the optical fibers 714 being able to slide within the buffer tubes 712 while the tubes 714 themselves are fixed relative to the binder film 720, one another, and/or the central strength member 718.

Referring now to FIG. 13, a fiber optic cable 810 includes a tube 812, such as a micromodule tube or a cable jacket, surrounding a plurality of optical fibers 816. According to an exemplary embodiment, the optical fibers 816 are tight-buffered, and include a polymeric over-coating 818 that protects the glass core and cladding of the optical fibers 816 and more than doubles the diameter of the optical fibers 816 relative to the diameter of the glass core and cladding, such as more than triples or even more than quadruples the diameter. In some embodiments, the cable 810 includes tensile strength elements 814 between the optical fibers 816 and the interior of the tube 812, such as aramid or fiberglass strands or yarns, that reinforce the optical fibers 816.

According to an exemplary embodiment, the cable 810 further includes a first powder 820 integrated with the tight buffers 818 of the optical fibers 816, such as partially embedded on the exterior surface thereof, and a second powder 822 integrated with the interior of the tube 812. In some embodiments, the first powder 820 is a high-friction powder that facilitates coupling between the optical fibers 816, and the second powder 822 is a lower-friction powder that facilitates sliding of the optical fibers 816 relative to the tube 812.

In contemplated embodiments, the particles of the first powder 820 are rounder than the particles of the second powder 822. In some such embodiments, the particles of the first powder 820 are smaller than the particles of the second powder 822, or otherwise differ from the particles of the second powder, as disclosed with regard to the other embodiments herein. In some contemplated embodiments, the tight-buffered optical fibers 816 may have powder 820 or powder 822 integrated therewith, as shown in FIG. 13, and no additional or no different powders used elsewhere in the corresponding cable.

Referring to FIG. 14, a fiber optic cable 910 includes a jacket 912 that forms a cavity 914 within which is positioned a stack 916 of fiber optic ribbons 920, each ribbon 920 including a plurality of optical fibers 922 in a matrix material 924. Rigid strength members 926, such as glass-reinforced plastic rods or steel wires, are embedded in the jacket 912. According to an exemplary embodiment, a first powder 928 is integrated with the interior surface of the cavity 914 and a second powder 930 is integrated with sides of the fiber optic ribbons 920. The ribbon stack 916 undulates lengthwise in a wave pattern within the cavity 914 such that the ribbons have excess length relative to the length of the cable 910 (e.g., at least 2% longer, at least 4% longer, at least 6% longer), contacting both the top and bottom of the cavity 914 a different points along the length of the cable 910.

In some embodiments, the first powder 928 may be configured to increase coupling of the ribbon stack 916 to the cavity 914 whereas the second powder 930 may be configured to decrease coupling between the ribbons 920 of the stack 916. In one embodiment, the first powder 928 includes super-absorbent polymer and the second powder 930 is different from the first powder 928 and may include a solid lubricant, such as graphite powder or talcum. In some embodiments, the second powder 930 is partially embedded in the matrix material 924 of the fiber optic ribbons 920.

In alternate contemplated embodiments, optical fibers of the cable 910 may be individual tight-buffered fibers, as shown in FIG. 13, or otherwise configured. In some contemplated embodiments, the exterior cross-sectional perimeter of the jacket 912 of the cable 910 is round. The ribbons 920 may not be stacked. The ribbons 920 include at least two, such as at least four, or at least eight optical fibers 922 each. In some embodiments, all of the ribbons 920 of the stack 916 have the same powder integrated therewith, while in other embodiments only the topmost and bottommost ribbons of the stack include any powder integrated therewith.

In still other embodiments, none of the ribbons 920 include powder 930 integrated therewith, and higher-friction powder 928 is integrated with the cavity 914 to provide coupling of the ribbon stack 920 to the cavity, with no additional or no different powders used elsewhere in the corresponding cable. The powder 928 may include dry or gummy adhesives integrated therewith and/or may provide the same coupling benefits otherwise provided by compressible tapes, as disclosed in U.S. Pat. No. 7,277,615 issued Oct. 2, 2007, which is incorporated by reference herein in its entirety. For example, the normalized pullout force of the ribbon stack 916, in some embodiments, is at least about 0.5 N/m, such as at least 0.7 N/m, or at least 0.75 N/m. In other embodiments in pullout force is less.

In contemplated embodiments, the inventive technology disclosed herein may be used with cables other than fiber optic cables, such as cables carrying electrically conductive components. Such contemplated embodiments may replace components disclosed herein for the fiber optic cables, with conductive elements, such as insulated conductive wires replacing optical elements, such as buffer tubes containing optical fibers. In some embodiments, hybrid cables incorporating the inventive technology disclosed herein may include both fiber optic and conductive elements. For example, the strength members 926 in FIG. 14 may also be copper conductive elements for electrical power transfer.

The construction and arrangements of the fiber optic cable, as shown in the various exemplary embodiments, are illustrative only. Although only a few embodiments have been described in detail in this disclosure, many modifications are possible (e.g., variations in sizes, dimensions, structures, shapes, and proportions of the various members, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. For example, the first and second powders may be switched in any of the embodiments disclosed herein to achieve alternate coupling effects. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive technology.

What is claimed is:

1. A method of manufacturing a fiber optic cable, comprising steps of:
    extruding an element of the fiber optic cable;
    motivating a first powder to impact a molten surface of the element such that particles of the first powder are partially embedded in the surface but include portions thereof that are not completely embedded and protrude beyond the surface;
    extruding a cable jacket of the fiber optic cable around the element;
    motivating a second powder to impact another surface of the fiber optic cable while the another surface is molten such that particles of the second powder are partially embedded in the another surface but include portions thereof that are not completely embedded and protrude beyond the another surface;
    wherein the first and second powders are completely dry powders, wherein the first and second powders both comprise particles of super-absorbent polymer, wherein the particles of super-absorbent polymer of the first powder are at least twice as large, on average volume, as the particles of super-absorbent polymer of the second powder or vice versa.

2. The method of claim 1, wherein the another surface is a second surface of the element that faces away from the surface of the element receiving the first powder.

* * * * *